(12) United States Patent
Juretzek

(10) Patent No.: US 10,568,069 B2
(45) Date of Patent: Feb. 18, 2020

(54) SIGNALLING FOR OFFLOADING BROADCAST SERVICES FROM A MOBILE NETWORK

(71) Applicants: TDF, Montrouge (FR); RAI RADIOTELEVISIONE ITALIANA S.p.A., Rome (IT)

(72) Inventor: Frieder Juretzek, Braunschweig (DE)

(73) Assignees: TDF SAS, Montrouge (FR); RAI RADIOTELEVISIONE ITALIANA S.P.A., Rome (IT)

( * ) Notice: Subject to any disclaimer, the term of this patent is extended or adjusted under 35 U.S.C. 154(b) by 76 days.

(21) Appl. No.: 15/895,452

(22) Filed: Feb. 13, 2018

(65) Prior Publication Data
US 2018/0234945 A1 Aug. 16, 2018

(30) Foreign Application Priority Data
Feb. 14, 2017 (EP) .................................... 17305164

(51) Int. Cl.
*H04W 72/00* (2009.01)
*H04W 4/06* (2009.01)
(Continued)

(52) U.S. Cl.
CPC ........... *H04W 72/005* (2013.01); *H04W 4/06* (2013.01); *H04W 48/12* (2013.01); *H04L 67/02* (2013.01); *H04W 88/08* (2013.01)

(58) Field of Classification Search
CPC ..... H04W 72/005; H04W 4/06; H04W 48/12; H04W 88/08; H04L 67/02
See application file for complete search history.

(56) References Cited

U.S. PATENT DOCUMENTS 9,107,186 B2 8/2015 Zhang et al.
2011/0070845 A1* 3/2011 Chen ....................... H04L 5/001
455/91

FOREIGN PATENT DOCUMENTS

EP 2 838 281 A1 2/2015

OTHER PUBLICATIONS

Juretzek, "Integration of high tower, high power LTE-Advanced broadcast into mobile networks", 2016 IEEE International Symposium on Broadband Multimedia Systems and Broadcasting (BMSB), IEEE, Jun. 2016, pp. 1-6.

(Continued)

*Primary Examiner* — Curtis A Alia
(74) *Attorney, Agent, or Firm* — Young & Thompson

(57) ABSTRACT

Disclosed is a method for accessing a broadcast service by a user equipment, the user equipment accessing a mobile network providing services carried on at least a first frequency carrier: —detecting at least one system information block within a downlink signal issued by the mobile network on the first frequency carrier, the system information block including cross-carrier signaling information indicating a resource location corresponding to a broadcast service provided by a non-unicast network on a second frequency carrier being disjoint from the first frequency carrier; —obtaining on-carrier signaling information related to at least a first broadcast service provided by the non-unicast network on the second frequency carrier, based on the resource location indicated in the system information block; and —accessing the first broadcast service based on the on-carrier signaling information.

20 Claims, 3 Drawing Sheets

(51) Int. Cl.
*H04W 48/12* (2009.01)
*H04L 29/08* (2006.01)
*H04W 88/08* (2009.01)

(56) References Cited

OTHER PUBLICATIONS

Ilsen et al., "Tower overlay over LTE-Advanced+ (TOoL+): Results of a field trial in Paris", 2016 IEEE International Symposium on Broadband Multimedia Systems and Broadcasting (BMSB), IEEE, Jun. 2016, pp. 1-6.
European Search Report, dated Aug. 3, 2017, from corresponding EP application No. 17305164.

* cited by examiner

SIGNALLING FOR OFFLOADING BROADCAST SERVICES FROM A MOBILE NETWORK

BACKGROUND OF THE INVENTION

Field of the Invention

The present invention generally relates to the transmission of wireless signals to user equipments and in particular to signaling steps that allow user equipments to access to the wireless signals.

It finds application, in particular while not exclusively, in offloading broadcast services from a cellular network, such as an LTE mobile network, in particular LTE-Advanced, which is initially dedicated to unicast services, to an existing broadcast network.

It aims in particular at relieving mobile networks by offloading broadcast contents, such as video contents, to existing High Tower, High Power (HTHP) transmitters of broadcast networks. This system is hereafter called Tower Overlay over LTE-Advanced, TOoL+.

Description of the Related Art

LTE-Advanced describes the latest evolution of cellular transmission standards developed by the 3GPP (Third Generation Partnership Projet).

A broadcast/multicast service named eMBMS, for "evolved Multimedia Broadcast Multicast Service", is integrated into LTE-A mobile networks.

Only up to 60% of the available LTE-A resources can be reserved for eMBMS services. Therefore, existing solutions propose to operate eMBMS together with unicast services on a regular LTE-A carrier supported by a cellular network, as eMBMS is only specified in a so called "mixed mode".

In contrast to cellular networks, traditional HTHP terrestrial broadcast networks offer a low cost alternative to cover wide areas with broadcast and multicast services.

To enable these much larger coverage areas, TOoL+ however requires signaling to permit a user equipment to access the broadcast services provided by the HTHP networks.

SUMMARY OF THE INVENTION

The present invention aims at improving the situation.

To this end, the invention relates to a method for accessing a broadcast service by a user equipment, the user equipment accessing a mobile network providing services carried on at least a first frequency carrier:

detecting at least one system information block within a downlink signal issued by the mobile network on the first frequency carrier, said system information block comprising cross-carrier signaling information indicating a resource location corresponding to a broadcast service provided by a non-unicast network on a second frequency carrier being disjoint from the first frequency carrier;

obtaining on-carrier signaling information related to at least a first broadcast service provided by the non-unicast network on the second frequency carrier, based on the resource location indicated in the system information block;

accessing said first broadcast service based on the on-carrier signaling information.

The non-unicast network can be for example a network that is originally dedicated to multicast/broadcast services, such as a network dedicated to TV broadcast. Such a network generally comprise HTHP transmitter having a large coverage compared to base stations of mobile networks.

The invention then introduces cross-carrier signaling from a first frequency carrier dedicated to a mobile network to a second frequency carrier of a non-unicast network. As the networks are distinct, which is not the case when cross-carrier signaling is performed between carriers of a same mobile network, no synchronization is required between the carriers.

Broadcast services are therefore offloaded to HTHP transmitters, which are dedicated to such services and can therefore provide a better coverage and can transmit more services (or the same services with an improved quality of service).

According to some embodiments of the inventions, the mobile network is a Long Term Evolution Advanced network, LTE-A, mobile network providing at least LTE-A unicast services and the broadcast service can be an LTE-A broadcast service. In the following description, the acronym LTE-A+ may be used to refer to the adaptation of the LTE-A specifications to High-Tower High Power signals.

As a complement, the non-unicast network can be configured for:

providing the LTE-A+ broadcast service only; or
providing the LTE-A+ broadcast service and at least one other broadcast service, said other broadcast service being different from an LTE-A+ broadcast service.

Therefore, because the non-unicast network provides services according to the same LTE-A specifications as the mobile network, the user equipment only requires a LTE-A receiver to receive the offloaded first broadcast service, which reduces the cost and congestion of the user equipment.

Still in complement, the other broadcast service can be a DVB-T2 broadcast service.

Therefore, the non-unicast network can share the resources between several broadcasting standards.

In complement or alternatively, the cross-carrier signal information may include an hybrid indicator, the hybrid indicator indicating whether the non-unicast network provides the LTE-A+ broadcast service only or the LTE-A+ broadcast service and the other broadcast service.

This enables to indicate to the user equipment that the offloaded LTE-A+ broadcast services are sharing resources with another broadcast service.

In complement, if the hybrid indicator indicates that the non-unicast network provides the LTE-A+ broadcast service and the other broadcast service, the cross-carrier signal information can further comprise information relating to resource allocation between the LTE-A+ broadcast service and the other broadcast service.

This enables to facilitate the access of the user equipment to the offloaded LTE-A+ broadcast services.

Still in complement, the information relating to resource allocation can comprise:

a first subfield indicating a first number of consecutive frames of the LTE-A+ broadcast service; and
a second subfield indicating a second number of consecutive frames of the other broadcast service.

This enables to facilitate the access of the user equipment to the offloaded LTE-A+ broadcast services.

According to some embodiments of the invention, the resource location can indicate the location of a control channel on the second frequency carrier and the on-carrier signaling information can be obtained from the control channel on the second frequency carrier.

This enables to facilitate the access of the user equipment to the offloaded broadcast services.

In complement, the cross-carrier signaling information can further comprise at least one of the following sub-fields:
- a repetition period indicating a period between two consecutive on-carrier signaling information on the control channel;
- a modification period indicating a minimum period between two different on-carrier signaling information;
- a modulation and coding scheme, MCS, of the control channel; and
- a subframe allocation information indicating the subframe carrying on-carrier signaling information.

The repetition and modification periods enable to save energy consumption by the user equipment as it does not need to access the control channel every repetition period. The MCS and subframe allocation information enable to facilitate the access of the user equipment to the offloaded broadcast services.

According to some embodiments of the invention, the on-carrier signal information indicates a first resource location of at least one first physical channel, the first physical channel carrying the first broadcast service, and the first broadcast service can be accessed on the first resource location.

This enables to facilitate the access of the user equipment to the offloaded broadcast services.

In complement, the on-carrier signal information indicates resource locations for a plurality of physical channels including the first physical channel, each physical channel carrying one or several broadcast services.

Each physical channel can define a common physical layer configuration, such as the modulation and the Forward Error Correction code rate, for each broadcast service transmitted within.

In complement, the on-carrier signaling information can comprise a common subframe allocation period, CSAP, indicating a time period during which resources of the second frequency carrier are divided between all the physical channels of the plurality of physical channels.

This enables to facilitate the access of the user equipment to the offloaded broadcast services.

Still in complement, the on-carrier signaling information can comprise a physical channel information list, and, for each given physical channel among the physical channels of the plurality, the physical channel information list can indicate at least one subfield among the following subfields:
- a subframe allocation end indicating a last subframe dedicated to the given physical channel in the CSAP;
- a modulation and coding scheme of the given physical channel; and
- an information indicating a resource location of each broadcast service carried by the given physical channel.

This enables to facilitate the access of the user equipment to the offloaded broadcast services.

A second aspect of the invention concerns a computer program comprising code instructions to implement the method according the first aspect of the invention, when said instructions are run by a processor.

A third aspect of the invention concerns a user equipment configured for accessing a mobile network providing services carried on at least a first frequency carrier, the user equipment comprising:
- a reception interface for receiving a downlink signal issued by the mobile network on the frequency carrier;
- a processor configured for detecting at least one system information block within the received downlink signal, said system information block comprising cross-carrier signaling information indicating a resource location corresponding to a broadcast service provided by a non-unicast network on a second frequency carrier being disjoint from the first frequency carrier;

the processor being further configured for obtaining on-carrier signaling information related to at least a first broadcast service provided by the non-unicast network on the second frequency carrier, based on the resource location indicated in the system information block and accessing said first broadcast service based on the on-carrier signaling information via the reception interface.

A fourth aspect of the invention concerns a telecommunications system comprising:
- a base station of a mobile network providing services carried on at least a first frequency carrier, said base station being configured for issuing a downlink signal on a first frequency carrier, said downlink signal comprising cross-carrier signaling information indicating a resource location corresponding to a broadcast service provided by a non-unicast network on a second frequency carrier being disjoint from the first frequency carrier;
- a transmitter of the non-unicast network configured for transmitting on-carrier signaling information related to at least a first broadcast service provided by the non-unicast network on the second frequency carrier, the on-carrier signaling information being broadcasted based on the resource location indicated by the cross-carrier signaling information, said transmitter being further configured for broadcasting the first broadcast service based on the on-carrier signaling information.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF THE PREFERRED EMBODIMENTS

Figure 1:
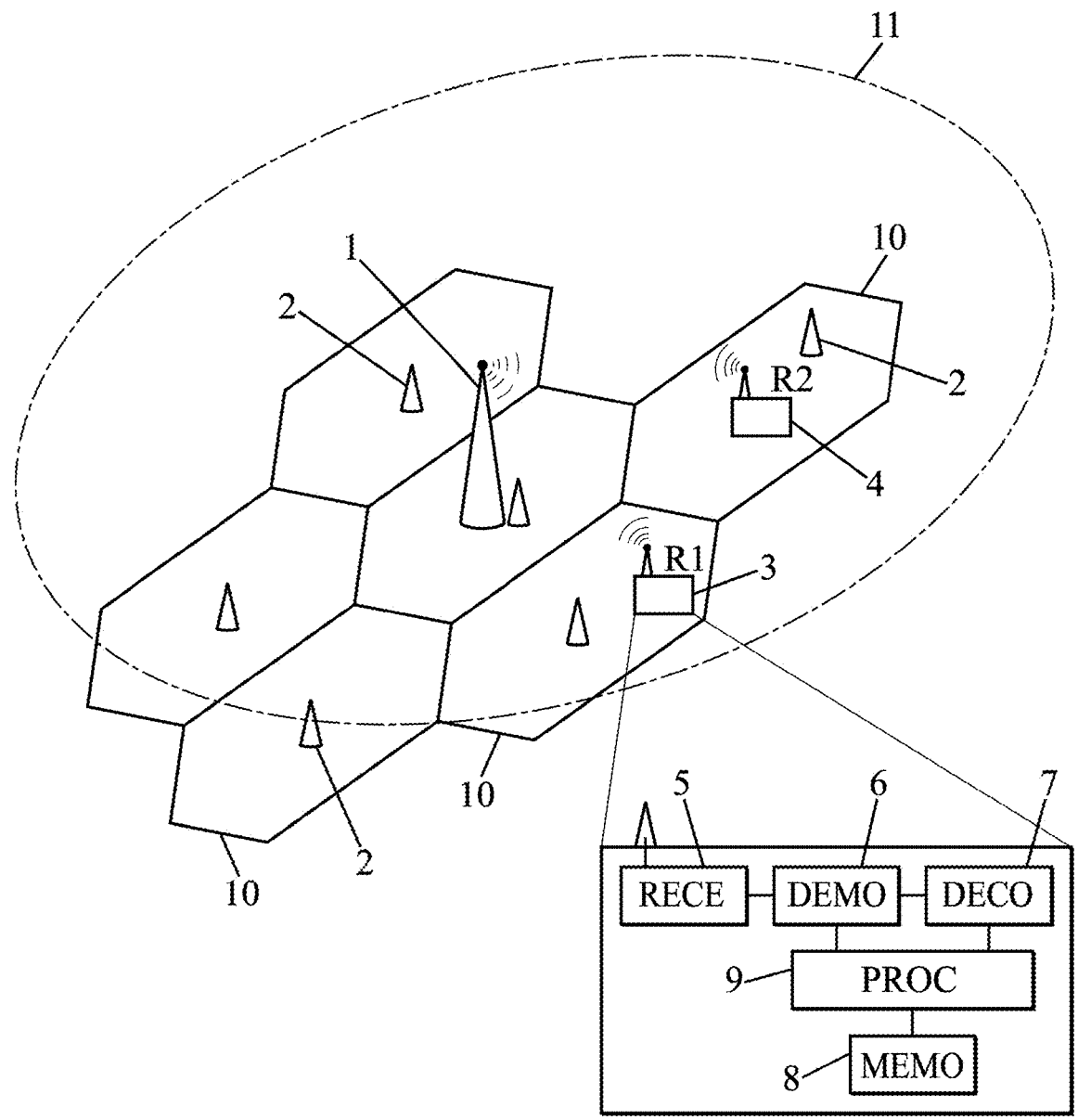
FIG. 1 illustrates a system according to some embodiments of the invention.

Referring to FIG. 1, there is shown a Tower Overlay over LTE-A+ system, TOoL+ system, which comprises a HTHP transmitter 1 of a non-unicast network, such as a broadcast network, having a first coverage area 11 covering several coverage areas 10 of base stations 2 of a mobile network, according to some embodiments of the invention. A non-unicast network means a network, which is originally designed to be dedicated to services other than unicast services, such as broadcast or multicast services.

The principle of Tower Overlay over LTE-A+, TOoL+, is to offload data originally transmitted through mobile networks, especially live video or other popular contents, to non-unicast networks such as broadcast networks, for example networks initially dedicated to broadcast television services.

Therefore, LTE-A broadcast services that were originally transmitted by the mobile network, using eMBMS for example, can be transmitted by an HTHP transmitter 1 instead of a base station 2 of the mobile network. These offloaded broadcast services are therefore called LTE-A+ broadcast services.

User Equipments, UE, 3 and 4 are configured for receiving and decoding LTE-A service data. The UEs can receive for example unicast LTE-A services through one of the base stations 2 of the mobile network, but also Multicast LTE-A services through this base station 2, via eMBMS for example. In addition, and in accordance with the invention, the UEs 3 and 4 can receive at least one LTE-A+ broadcast service issued from the HTHP transmitter 1 provided they are located within the first coverage area 11.

Above, and in what follows, a specific example of offloading broadcast services that conform to the LTE-A specifications is considered. However, the broadcast services that are offloaded can conform to any other telecommunications standard. In that case, the user equipments 3 and 4 can be equipped with receivers dedicated to this other telecommunications standard.

The use of the HTHP transmitter 1 to broadcast the LTE-A+ broadcast services to all the UEs contained in the first coverage area 11, avoids distributing these services in many mobile networks cells 2, which possibly belong to different network operators.

The invention is more precisely concerned by signaling that enables the UEs to access the LTE-A+ broadcast services provided by the HTHP transmitter 1. The present invention introduces additional physical layer and signaling options.

As illustrated on FIG. 1, the UEs may comprise a receiving interface 5, a demodulator 6, a decoder 7 and a memory unit 8, which are under the control of a processor 9. The memory unit 8 may comprise a non-volatile unit which retrieves the computer program and a volatile unit which can retrieve a signal transmission robustness scheme and/or a code rate scheme of an implemented Forward Error Correction scheme and a sequence of modulation schemes.

Figure 2:
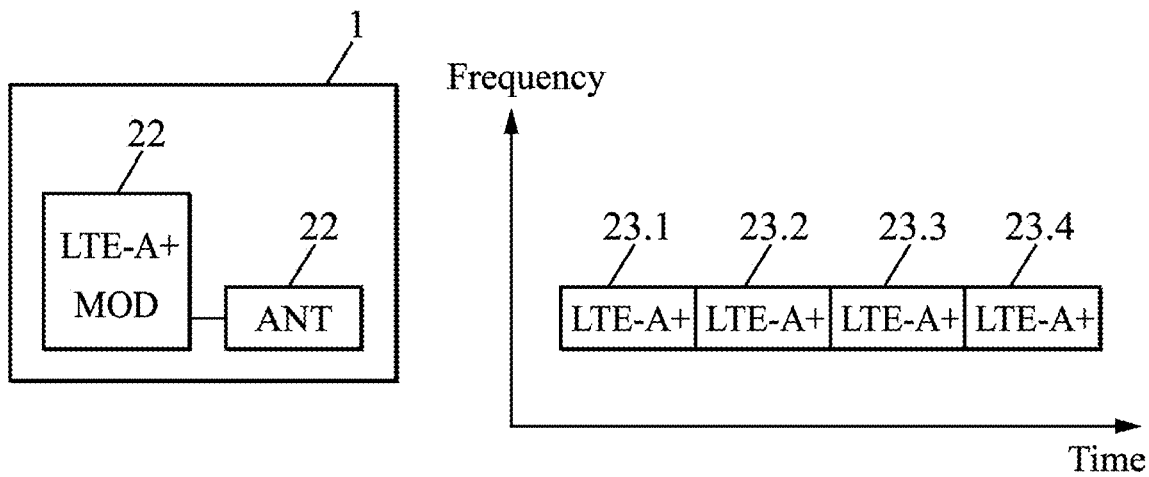
FIG. 2 represents a HTHP transmitter according to a first scenario.
Figure 3:
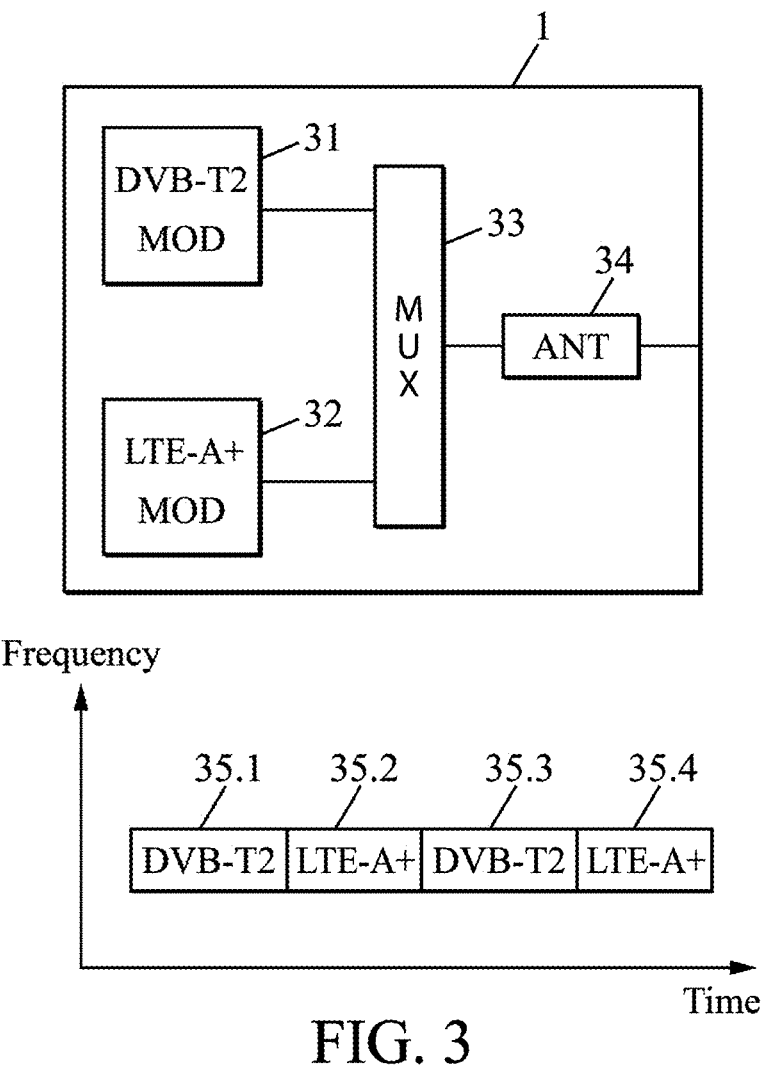
FIG. 3 represents a HTHP transmitter according to a second scenario.

The TOoL system according to the invention, noted TOoL+, defines two HTHP scenarios that are illustrated on FIGS. 2 and 3.

According to a first scenario that is illustrated on FIG. 2, the non-unicast network comprising the HTHP transmitter 1 carries LTE-A+ broadcast services only. In that case, the HTHP transmitter 1 comprises a LTE-A+ modulator 21 and an antenna 22. The LTE-A+ modulator 21 is arranged to receive data, such as video data or audio data, to be encoded in a format that satisfies the LTE-A specifications.

In that example, all the time-frequency resources of the HTHP transmitter 1 are dedicated to the transportation of LTE-A+ broadcast content and control data, thereby addressing all user equipments that are compatible with the LTE-A specifications. Therefore, the antenna 22 broadcasts only LTE-A+ frames 23.1-23.4 in the first coverage area 11.

According to a second scenario that is illustrated on FIG. 3, the non-unicast network carries both LTE-A+ broadcast services and DVB-T2 services.

To this end, the HTHP transmitter 1 comprises an LTE-A modulator 32 and a DVB-T2 modulator 31. The LTE-A+ modulator 32 is arranged to receive data, such as video data or audio data, to be encoded in a format that satisfies the LTE-A+ specifications. The DVB-T2 modulator 31 is arranged to receive data, usually video data, to be encoded in a format that satisfies the DVB-T2 specifications.

The HTHP transmitter 1 may also comprise a multiplexer 33 to multiplex the data issued from the modulators 31 and 32 and to transmit the multiplexed data to an antenna 34.

For example, and as shown on FIG. 3, the data issued from the modulators 31 and 32 can be time-multiplexed, so that one or several DVB-T2 frames 35.1 and 35.3 are alternated with one or several LTE-A+ frames 35.2 and 35.4 when broadcasted by the antenna 34 in the first coverage area 11.

A single antenna 34 has been shown on FIG. 3. However, the invention is not restricted to this example and also encompasses the case where an antenna is dedicated to each of the modulators 31 and 32. In that case, the antennas need to be synchronized so as to ensure that the LTE-A+ frames and the DVB-T2 frames are timely alternated.

Of course, the HTHP transmitter 1 shown on FIG. 3 can also be used in the first scenario, and can alternate between the first and second scenarios upon demand.

As explained above, to benefit from the HTHP offload approach, a new signaling method is required. The signaling method is described with reference to FIG. 4.

Figure 4:
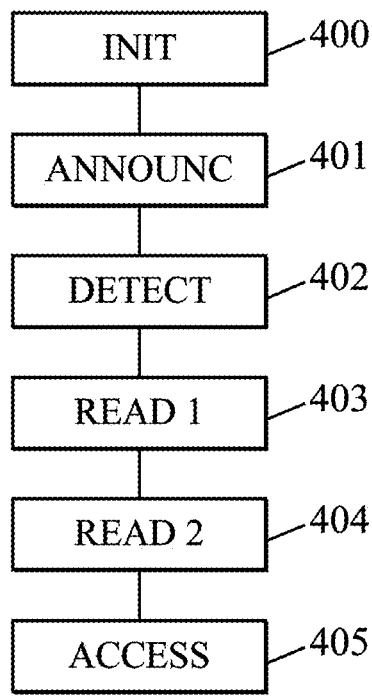
FIG. 4 is a flowchart illustrating the steps of a method according to some embodiments of the invention.

FIG. 4 is a flowchart illustrating the steps of a method according to some embodiments of the invention. For example, signaling is performed so as to enable the user equipment 3 to access a broadcast service of the HTHP transmitter 1. These steps can be performed by the user equipment 3 illustrated on FIG. 1, in particular by the processor 9.

At step 400, the user equipment 3 is initially synchronized with the mobile network and in particular with one of the base stations 2. This step is not further detailed in the present description as it is well known in the art.

At an optional step 401, the user equipment 3 may receive a TOoL+ service announcement via the base station 2, for example via higher layer signaling, such as HTTP signaling for example. The announcement may indicate the existence of a LTE-A+ broadcast service that is offloaded to a HTHP TOoL+ carrier. This step is optional as the user equipment 3 may know about the existence of the LTE-A+ broadcast service that is offloaded to the HTHP TOoL+ carrier, without the need to receive any announcement.

At step 402, the user equipment 3 can detect the location of at least one system information block within the LTE downlink signal issued by the base station 2. To this end, the user equipment 3 can for example read a first system information block #1 that indicates the location, and optionally the configuration, of all system information blocks carried within the downlink signal issued from the base station 2.

The detected at least one information block is located on a first frequency carrier, which is a frequency carrier used by the mobile network to transmit LTE downlink signals.

At step 403, the at least one system information block is read by the user equipment 3. The system information block comprises cross-carrier signaling information indicating a resource location corresponding to a broadcast service provided by the non-unicast network (a LTE-A+ broadcast service by the HTHP transmitter 1). The broadcast service is carried on a second frequency carrier being disjoint from the first frequency carrier (this is why the expression "cross carrier signaling" is used) and which is not dedicated to the mobile network services.

The aim of the cross-carrier signaling is to notify the user equipment 3 where to find the LTE-A+ broadcast service signal issued by the HTHP transmitter 1, at least in the frequency domain, by indicating the second frequency carrier. The resource location may also indicate a time location of the broadcast service signal.

As it will be understood from the following description, the cross-carrier signaling information may also signal the amount of time-domain resources which are dedicated to LTE-A+ broadcast services on the second frequency carrier and may also provide information related to the resource location of control data broadcasted by the HTHP transmitter 1. Control data broadcasted by the HTHP transmitter 1 may include scheduled resources, modulation and coding parameters, etc, for the LTE-A+ broadcast services broadcasted on the second frequency carrier.

The cross carrier signaling information may comprise the following fields:

EARFCN: the Absolute Radio-Frequency Channel Number, ARFCN, which can be used to indicate the second frequency carrier, for example a center frequency of the second frequency carrier. As this type of field is used in LTE-A, it enables to remain compatible with existing solutions while offloading broadcast services from the mobile network to the non-unicast network. The user equipment 3 may know in advance the frequency width of the second frequency carrier, so that only the center frequency is required to know the position of the second frequency carrier;

TOoL+ carrier ID: an identifier of the second frequency carrier. For example, it indicates Mobile Network Operator, MNO, specific information such as the Public Land Mobile Network, PLMN, identifier. This field is used in LTE-A for indicating area used for transmitting eMBMS by the mobile network, and can therefore be used to identify an area of the TOoL+, such as the first coverage area 11;

Bandwidth: a value indicating the bandwidth of the second frequency carrier. This field is optional since the bandwidth of the second frequency carrier can be signaled on the second frequency carrier itself. In the current LTE-A specifications, this field indicates bandwidth of an LTE-A carrier of the mobile network. This field is part of the Master Information Block, MIB, of each LTE-A carrier of the mobile network;

Hybrid indicator: this indicator indicates whether the second frequency carrier is dedicated to LTE-A+ only or is shared between LTE-A+ and another broadcast service such as DVB-T2. In what follows, for illustrative purposes, the example of DVB-T2 is considered as an example of another broadcast service;

Second frequency carrier allocation information: is only present in the event where the hybrid indicator indicates that the second frequency carrier is shared between LTE-A+ and DVB-T2. This information can indicate how resources are allocated between LTE-A+ and DVB-T2 on the second frequency carrier. For example, it can include two subfields:

A number of LTE-A+ elemental frames: indicates the number of consecutive elemental frames of the LTE-A+ part. An elemental frame is a uniquely defined time interval, or frame length, for TOoL+. The actual elemental frame length depends on the bandwidth of the second frequency carrier. For example, referring to FIG. 3, the number of LTE-A+ elemental frames can be equal to 1;

Number of DVB-T2 elemental frames: indicating the number of consecutive elemental frames of the DVB-T2 part. For example, referring to FIG. 3, the number of DVB-T2 elemental frames can be equal to 1;

TOoL+ Multicast Control Channel information: this information indicates the location of a control channel of the TOoL+ carrier (second frequency carrier), and can also indicate a configuration of the control channel. This information can comprise the following subfields:

MCCH repetition period: indicates a time period between two MCCH information, expressed in frames;

MCCH modification period: indicates a minimum distance between two different MCCH information, expressed in frames. This value is a multiple of the MCCH repetition period. This subfield enables the user equipment 3 to save energy consumption and it does not have to receive the MCCH information at each MCCH repetition period;

Signaling Modulation and Coding Scheme, MCS: indicates a configuration (Modulation and Coding Scheme, MCS) of the TOoL+ MCCH;

Subframe Allocation Information: indicates the specific subframe being used for MCCH information.

The subfields of Tool+ MCCH described above are used for LTE-A eMBMS as part of its on-carrier signaling. The present invention proposes to re-use these subfields in the context of TOoL+ cross carrier signaling.

The subfield Subframe Allocation Information originally used for LTE-A eMBMS can be extended to indicate a wider range of available subframes for MCCH because TOoL+ uses all its LTE-A+ subframes for broadcast services.

The cross carrier signaling information may further comprise the following fields:

TOoL+ notification configuration: indicates the location (frame and subframe location) on the regular LTE-A carrier (the first frequency carrier), which holds a possible change notification of the TOoL+ MCCH;

TOoL+ notification indicator: indicates the specific bit on the regular LTE-A carrier that is used to indicate whether there is a modification of the TOoL+ MCCH (complementary to TOoL+ notification configuration).

Cross carrier signaling preferably indicates at least the time frequency location (or more generally the resource location) of the TOoL+ MCCH on the second frequency carrier, all the other fields described above being optional.

Based on the above cross-carrier signaling carried by the mobile network on the first carrier to indicate how to access to the LTE-A+ broadcast services provided by the HTHP transmitter 1 of the TOoL+ system, the user equipment 3 can read (or obtain), at a step 404, the TOoL+ MCCH (as mentioned above) carrying on-carrier signaling information for accessing at least a first broadcast service on the second frequency carrier.

The on-carrier signaling information can indicate the scheduling and configuration of Physical Multicast Channels, PMCH. For each PMCH carrying one or several LTE-A+ broadcast services, such as the first broadcast service, a common physical layer configuration is defined, such as a modulation scheme and/or a Forward Error Correction, FEC, code rate that are common to all the broadcast services carried by the PMCH.

Broadcast services carried by different PMCHs may have different requirements in terms of quality of service such as coverage area, robustness, mobility, data rate, etc.

The on-carrier signaling information can comprise one or several of the following fields:

Common Subframe Allocation Period (CSAP): indicates the time period, in LTE-A+ frames, during which the resources of the TOoL+ carrier (second frequency carrier) are divided between all the PMCHs. Therefore, within one CSAP, all the PMCHs are mapped once;

PMCH Information List: indicates the location (time and frequency for example) and the configuration of each PMCH. Each entry of the PMCH Information list (for each broadcast service) can comprise one or some of the following subfields:

Subframe Allocation End: indicates the last subframe that is dedicated to the specific PMCH, within each CSAP. Together with the Subframe Allocation End values of the other PMCHs, the exact location (in terms of subframes) of the specific PMCH can be determined;

Data MCS: indicates the modulation and coding scheme of the specific PMCH;

MCH Scheduling Period: indicates the periodicity and location of the MCH Scheduling Information. This information indicates the location of each broadcast service within the specific PMCH;

A list of TOoL+ Session Information: indicates additional information for each broadcast service, such as logical channel identifier or PLMN ID (Public Land Mobile Network Identifier, used to identify the mobile network operator).

The Subframe Allocation End may be extended compared to the similar field used for eMBMS, in order to indicate a wider range of available subframes for broadcast service mapping on the second frequency carrier, because the TOoL+ uses all the LTE-A+ subframes for broadcast services.

Of course, the invention also applies to the case where a PMCH is dedicated to a single broadcast service. For example, a first PMCH is dedicated to the first broadcast service.

Based on the on-carrier signaling information received at step 404, the user equipment 3 can access, at step 405, to the first broadcast service, for example (or more generally to a service carried in a PMCH indicated in the on-carrier signaling), by accessing a resource location identified by the MCH Scheduling Information of the first PMCH carrying the first broadcast service.

Figure 5:
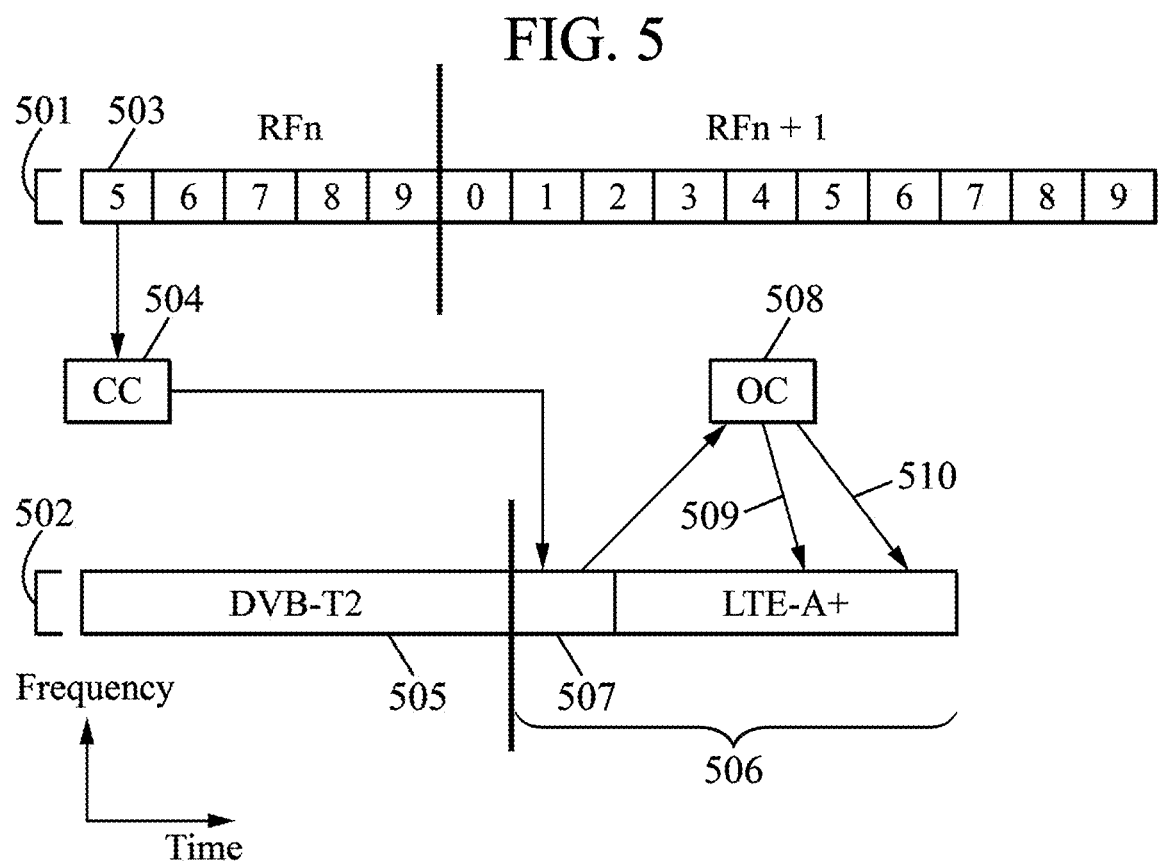
FIG. 5 illustrates time-frequency resources of the non-unicast network and of the mobile network according to some embodiments of the invention.

FIG. 5 illustrates time-frequency resources according to some embodiments of the invention.

A first frequency carrier 501 is used by the mobile network to provide LTE-A services via base stations 2. As explained above, broadcast services initially carried by eMBMS on the mobile network can be offloaded to the TOOL+ system comprising the HTHP transmitter 1. To this end, cross carrier signaling is performed on the first frequency carrier 501 to transmit control information that relates to a second frequency carrier 502.

The second frequency carrier 502 is used by the TOoL+ system to carry at least the first broadcast service via the HTHP transmitter 1.

As shown on FIG. 5, in the first frequency carrier 501, radioframes n and n+1 are split in ten respective subframes.

Cross carrier signaling information 504 can for example be contained in some resources of the 5$^{th}$ subframe of radioframe n.

This cross carrier signaling information 504 indicates to the user equipment 3 how to access to on-carrier signaling information 508 on the second frequency carrier 502. The on-frequency carrier 507 can be comprised in a subframe 507 of the LTE-A+ frame 506. As shown on FIG. 5, it illustrates a case where resources of the HTHP transmitter 1 are alternated between DVB-T2 frames 505 and LTE-A+ frames 506 (second scenario of FIG. 3).

As also shown on FIG. 5, the LTE-A frames on the first frequency carrier 501 and the LTE-A+ frames on the second frequency carrier 502, do not need to be synchronized, as they are transmitted by entities of different networks.

The on-carrier signaling information 508 can then indicate to the user equipment 3 the respective locations of broadcast services 509 and 510 in the LTE-A+ frame 506.

The present invention therefore proposes to aggregate at least two signals/frequency carriers to a single logical channel (a single logical service) without the need to synchronize the frames/subframes between the frequency carriers. On the contrary, carrier aggregation in the context of classical LTE-A requires specific synchronization between all component carriers due to the fact that only one of the component carriers provides the complete resource signaling information and all other component carriers provide resources for user data (the actual content) only.

In TOoL+, the different frequency carriers originate from different network topologies (base stations 2 and HTHP transmitter 1). The different frequency carriers delay spreads at the user equipment 3 would make a specific synchronization between the frequency carriers 501 and 502 impossible without the use of extensive buffering of the frequency carriers. Since each of the frequency carriers 501 and 502 according to the present invention carries its own share of signaling, the synchronization is not required.

The present invention therefore proposes to aggregate a mobile network signal which carried unicast or broadcast data over a regular mobile access network and a HTHP signal which carries broadcast data over a regular broadcast network, to a single logical channel/service.

So far, user equipments such as mobile devices always required additional broadcast receivers in order to receive broadcast content from HTHP broadcast networks.

With the TOoL+ system according to the invention, the first and second frequency carriers are part of the same mobile network standard, which means that only one type of receiver is needed within the user equipments (for example a LTE-A receiver).

The invention claimed is:

1. A method for accessing a broadcast service by a user equipment (3), said user equipment accessing a mobile network providing services carried on at least a first frequency carrier (501):

detecting (402) at least one system information block within a downlink signal issued by the mobile network on the first frequency carrier, said system information block comprising cross-carrier signaling information (504) indicating a resource location corresponding to a broadcast service provided by a non-unicast network on a second frequency carrier (502) being disjoint from the first frequency carrier;

obtaining (404) on-carrier signaling information (508) related to at least a first broadcast service provided by the non-unicast network on the second frequency carrier, based on the resource location indicated in the system information block;

accessing (405) said first broadcast service based on the on-carrier signaling information.

2. The method according to claim 1, wherein the mobile network is a Long Term Evolution Advanced network, LTE-A, mobile network providing at least LTE-A unicast services and wherein the broadcast service is an LTE-A broadcast service named LTE-A+ broadcast service.

3. The method according to claim 2, wherein the non-unicast network is configured for:
  providing the LTE-A+ broadcast service only; or
  providing the LTE-A+ broadcast service and at least one other broadcast service, said other broadcast service being different from an LTE-A broadcast service.

4. The method according to claim 3, wherein the other broadcast service is a DVB-T2 broadcast service.

5. The method according to claim 4, wherein the cross-carrier signal information includes an hybrid indicator, said hybrid indicator indicating whether the non-unicast network provides the LTE-A+ broadcast service only or the LTE-A+ broadcast service and the other broadcast service.

6. The method according to claim 4, wherein the resource location indicates the location of a control channel on the second frequency carrier (502) and wherein the on-carrier signaling information (508) is obtained from the control channel on the second frequency carrier.

7. The method according to claim 3, wherein the cross-carrier signal information includes an hybrid indicator, said hybrid indicator indicating whether the non-unicast network provides the LTE-A+ broadcast service only or the LTE-A+ broadcast service and the other broadcast service.

8. The method according to claim 7, wherein, if the hybrid indicator indicates that the non-unicast network provides the LTE-A+ broadcast service and the other broadcast service, the cross-carrier signal information further comprises information relating to resource allocation between the LTE-A+ broadcast service and the other broadcast service.

9. The method according to claim 8, wherein the information relating to resource allocation comprises:
  a first subfield indicating a first number of consecutive frames of the LTE-A+ broadcast service; and
  a second subfield indicating a second number of consecutive frames of the other broadcast service.

10. The method according to claim 2, wherein the resource location indicates the location of a control channel on the second frequency carrier (502) and wherein the on-carrier signaling information (508) is obtained from the control channel on the second frequency carrier.

11. The method according to claim 1, wherein the resource location indicates the location of a control channel on the second frequency carrier (502) and wherein the on-carrier signaling information (508) is obtained from the control channel on the second frequency carrier.

12. The method according to claim 11, wherein the cross-carrier signaling information (504) further comprises at least one of the following sub-fields:
  a repetition period indicating a period between two consecutive on-carrier signaling information on the control channel;
  a modification period indicating a minimum period between two different on-carrier signaling information;
  a modulation and coding scheme of the control channel; and
  a subframe allocation information indicating the subframe carrying on-carrier signaling information.

13. The method according to claim 1, wherein the on-carrier signal information (508) indicates a first resource location of at least one first physical channel, said first physical channel carrying said first broadcast service, and wherein the first broadcast service is accessed on the first resource location.

14. The method according to claim 13, wherein the on-carrier signal information indicates resource locations for a plurality of physical channels including the first physical channel, each physical channel carrying one or several broadcast services.

15. The method according to claim 14, wherein the on-carrier signaling information comprises a common sub-frame allocation period, CSAP, indicating a time period during which resources of the second frequency carrier are divided between all the physical channels of the plurality of physical channels.

16. The method according to claim 15, wherein the on-carrier signaling information comprises a physical channel information list, wherein for each given physical channel among the physical channels of the plurality, the physical channel information list indicates at least one subfield among the following subfields:
  a subframe allocation end indicating a last subframe dedicated to the given physical channel in the CSAP;
  a modulation and coding scheme of the given physical channel; and
  an information indicating a resource location of each broadcast service carried by the given physical channel.

17. A non-transitory computer readable storage medium having recorded thereon a computer program comprising code instructions to implement the method according to claim 1 when said instructions are run by a processor.

18. A user equipment (3) configured for accessing a mobile network providing services carried on at least a first frequency carrier, said user equipment comprising:
  a reception interface (5) for receiving a downlink signal issued by the mobile network on the frequency carrier;
  a processor (9) configured for detecting at least one system information block within the received downlink signal, said system information block comprising cross-carrier signaling information indicating a resource location corresponding to a broadcast service provided by a non-unicast network on a second frequency carrier being disjoint from the first frequency carrier;
  the processor being further configured for obtaining on-carrier signaling information related to at least a first broadcast service provided by the non-unicast network on the second frequency carrier, based on the resource location indicated in the system information block and accessing said first broadcast service based on the on-carrier signaling information via the reception interface.

19. A system comprising:
  a base station (2) of a mobile network providing services carried on at least a first frequency carrier, said base station being configured for issuing a downlink signal on a first frequency carrier, said downlink signal comprising cross-carrier signaling information indicating a resource location corresponding to a broadcast service provided by a non-unicast network on a second frequency carrier being disjoint from the first frequency carrier;
  a transmitter (1) of the non-unicast network configured for transmitting on-carrier signaling information related to at least a first broadcast service provided by the non-unicast network on the second frequency carrier, the on-carrier signaling information being broadcasted based on the resource location indicated by the cross-carrier signaling information, said transmitter being further configured for broadcasting the first broadcast service based on the on-carrier signaling information.

20. The method according to claim 3, wherein the resource location indicates the location of a control channel on the second frequency carrier (502) and wherein the on-carrier signaling information (508) is obtained from the control channel on the second frequency carrier.

* * * * *